United States Patent Office 3,763,198
Patented Oct. 2, 1973

3,763,198
AMINO SUBSTITUTED ORGANO TIN CARBOXYLATES AND THE PREPARATION THEREOF
William Tait Flannigan, Kilwinning, and Robert Muir Gibbon, West Kilbride, Scotland, assignors to Imperial Chemical Industries Limited, London, England
No Drawing. Filed May 24, 1971, Ser. No. 146,566
Claims priority, application Great Britain, June 1, 1970, 26,321/70
Int. Cl. C07f 7/22
U.S. Cl. 260—429.7
7 Claims

ABSTRACT OF THE DISCLOSURE

New amino organotin compounds suitable for use as catalysts for organopolysiloxane paper treating compositions, compositions containing these and treatment of, for example, paper therewith.

---

This invention relates to a new class of tin compounds and to compositions based on organopolysiloxanes containing such compounds.

According to the present invention a new and useful class of tin compounds comprises compounds of the general formula $YO(R_2SnO)_mX$ where R is an alkyl group having not more than 20 carbon atoms, Y is a group of the formula $(R^1R^2C=N-)$ or 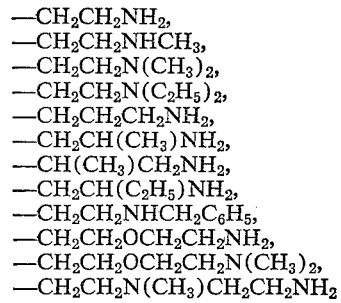

in which $R^1$ is hydrogen or $R^2$ which is a monovalent hydrocarbon group and $R^3$ is hydrogen or a monovalent hydrocarbon group, X is an aminoalkyl group of the formula $(R^4R^5NR^6-)$ where $R^4$ and $R^5$, which need not be alike, are hydrogen or alkyl, cycloalkyl or aminoalkyl groups or monovalent groups consisting of alkylene and alkyl groups joined by one or more $>NR^7$ groups or oxygen atoms or $R^4$ and $R^5$ together form a single alkylene group or a group consisting of alkylene groups joined by one or more $>NR^7$ groups or oxygen atoms where $R^7$ is hydrogen or an alkyl group having not more than 5 carbon atoms and $R^6$ is an alkylene group or consists of alkylene groups joined together by one or more $>NR^7$ groups or oxygen atoms, the essential nitrogen atom in the group X being bonded to a carbon atom in the group $R^6$ other than that joined to tin by the C—O—Sn linkage, and m is an integer from 1 to 4.

The alkyl groups R, which need not be alike, may be, for example, methyl, ethyl, propyl, butyl, octyl, decyl or octadecyl groups. In general, however, butyl or octyl groups are preferred.

The monovalent hydrocarbon group $R^2$ may be an alkyl, aryl, alkaryl, arakyl, cycloalkyl or cycloalkenyl group. Suitable groups include, for example, methyl, ethyl, propyl, butyl, hexyl, cyclohexyl, phenyl, tolyl and benzyl groups. When Y is a group of the formula $R^1R^2C=N-$ it is preferred that at least one of the groups $R^1$ and $R^2$ be a phenyl group and it is further preferred that $R^1$ be hydrogen and that $R^2$ be a phenyl group.

The group $R^3$, which may be hydrogen or an alkyl, aryl, alkaryl or aralkyl group, preferably has less than 5 carbon atoms. The group

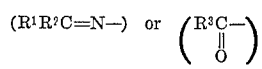

may be, for example, a formyl, acetyl, propionyl, butyryl, octoyl such as 2-ethyl-n-hexoyl, lauroyl or benzoyl group.

The groups $R^4$ and $R^5$, which may be hydrogen or alkyl, aryl, alkaryl, aralkyl groups, preferably have less than 5 carbon atoms. It is, however, normally preferred that they be hydrogen, methyl, or ethyl groups.

While $R^6$ may vary widely and may be, for example, ethylene, propylene, isopropylene, octylene, methyleneoxyethylene, propylene-oxy-ethylene, ethylene-oxypropylene, ethylene-oxy-butylene, ethylene amino ethylene, ethylene amino butylene or butylene amino ethylene, it is, however, preferred that it be ethylene amino isopropylene.

The group X may be, for example,

—$CH_2CH_2NH_2$,
—$CH_2CH_2NHCH_3$,
—$CH_2CH_2N(CH_3)_2$,
—$CH_2CH_2N(C_2H_5)_2$,
—$CH_2CH_2CH_2NH_2$,
—$CH_2CH(CH_3)NH_2$,
—$CH(CH_3)CH_2NH_2$,
—$CH_2CH(C_2H_5)NH_2$,
—$CH_2CH_2NHCH_2C_6H_5$,
—$CH_2CH_2OCH_2CH_2NH_2$,
—$CH_2CH_2OCH_2CH_2N(CH_3)_2$,
—$CH_2CH_2N(CH_3)CH_2CH_2NH_2$ or a group of general formula —$CH_2(CH_3)CH_2(NHCH_2CH_2)_nNH_2$ where n is 1, 2, 3 or 4.

The tin compound of our invention which are preferred for a number of uses are:

[1-(2-aminoethyl amino)-propan-2-oxy](benzaldoximo)(dibutyl)stannane,
(acetoxy)[1-(2-aminoethyl amino)-propan-2-oxy](dibutyl)stannane,
1'-[1-(2 acetoxy)[1-2 aminoethyl amino)-propan-2-oxy]-(1',1',3',3'-tetrabutyl) distannoxane,
1'-[1-(2 aminoethyl amino)propan-2-oxy](3'-benzaldoximo)(1',1',3',3'-tetrabutyl) distannoxane,
(acetoxy)[1-(2-aminoethyl amino)propan-2-oxy](dioctyl)stannane,
1'-[1-(2-aminoethyl amino)propan-2-oxy](3'-benzaldoximo)(1',1',3',3'-tetra-octyl) distannoxane,
(acetoxy)(dibutyl)(1-diethylene triamino-propan-2-oxy) stannane,
(acetoxy)(dibutyl)(1-tetraethylene pentamino ethoxy) stannane,
(acetoxy)(2-aminoethoxy)(dibutyl)stannane,
(acetoxy)(2-aminobutoxy)(dibutyl)stannane,
(2-aminobutoxy)(benzaldoximo)(dibutyl)stannane, and
(acetoxy)[2-(N,N'-dimethylamino)ethoxy](dibutyl) stannane.

While m may vary from 1 to 4 it is in fact found that as m decreases our compounds become more soluble in organic solvents. When used in organopolysiloxane coating composition their ability to cure increases to a maximum when m is 1.

The new tin compounds of our invention may be prepared by several methods. A preferred method for one class of compounds is to react an organotin oxide with an oxime in the presence of an organic solvent, then to react the product with an amino-alcohol. Another preferred class may be prepared by reacting an organotin oxide with a carboxylic acid in presence of an organic solvent and then reacting the product with an amino-alcohol. Another method of making the latter class of compounds is by reacting an organotin oxide with an amino-alcohol followed by reacting the product with an organotin acrylate. The compounds may also be prepared by reacting an organotin oxide with a low boiling alcohol followed by reacting the product with an amino-alcohol and removing the low boiling alcohol formed by fractional distillation and thereafter reacting the product of this reaction with an organotin acrylate. The compounds may be prepared either alone, in admixture with other tin compounds of our invention or in admixture with other organotin compounds not according to our invention. The reactants may thus be used in a wide variety of proportion. Where these compounds are used as curing agents for organopolysiloxane coating compositions the ratio of the reactants used is, however, an important factor in determining the characteristics of the finished cured silicone surface. It also determines the properties of the catalysed coating solution. Thus the reactant properties may vary as follows, for example, 1 mole of dibutyltin oxide, $y$ moles of glacial acetic acid and $z$ moles of 1-(2-aminoethyl amino) propan-2′-ol where $y+z$ is not more than 2 and $y$ and $z$ are each not less than 0.25 and the requisite weight of toluene to produce a 50 percent solution are heated under reflux, the water formed being removed by azeotropic distillation. The preferred ratio of reactants is, however, when $y=z=1$.

The reaction is preferably carried out at a temperature and in a manner such that the water or other volatile by-product is distilled off azeotropically.

Our invention also resides in coating compositions containing our tin compounds and based on organopolysiloxanes, said compositions being useful for conferring release properties on surfaces such as paper, polyolefins such as polyethylene, or polypropylene, polyesters such as polyethylene terephthalate, vinyl polymers such as polyvinyl chloride and polyvinylidene dichloride, and metal foils such as aluminium and the like.

The compositions of our invention comprise 100 parts by weight of a diorganopolysiloxane having per molecule at least two hydroxyl groups attached to two different silicon atoms and of viscosity not less than 3000 cs. at 25° C., 1 to 10 parts by weight of a monoorganohydrogenpolysiloxane of viscosity not greater than 1000 cs. at 25° C. and 1 to 20 parts by weight of an organotin compound of the kind hereinbefore described.

The diorganopolysiloxane, while consisting essentially of diorganosiloxanyl units, may also contain a small proportion of trifunctional silicon atoms attached to a single organo group, provided the amount of such is not sufficient to destroy the solubility of the diorganopolysiloxane in the chosen organic solvent. The organo groups in the diorganopolysiloxane may be alkyl, aryl, aralkyl, alkaryl, alkenyl, cycloalkyl or cycloalkenyl groups or such groups containing a variety of substituents such as halogens or cyano groups. Suitable groups include, for example, methyl, ethyl, phenyl, vinyl, cyclohexyl, 3,3,3-trifluoropropyl and chlorophenyl groups. In many cases it is preferred that at least the major proportion, and in some cases all, of the organo groups be methyl groups.

The mono - organohydrogenpolysiloxane is normally preferably used in amount not less than 3 parts by weight per 100 parts by weight of the diorganopolysiloxane. It may be linear or cyclic or contain a proportion of both. The mono-hydrogenpolysiloxane may, if desired, also contain a proportion, preferably not more than a minor proportion, of diorganosiloxany units, but should contain at least one silicon-bonded hydrogen atom for every three silicon atoms. If linear, it may be terminated by, for example, triorganosilyl, diorganohydrogensilyl or diorganohydroxysilyl groups.

The organo groups in the mono-organohydrogenpolysiloxane may be alkyl, aryl, aralkyl, alkaryl, alkenyl or cycloalkenyl groups. Suitable groups which may be used include, for example, methyl, ethyl, phenyl, tolyl, benzyl and vinyl groups. Preferred siloxanes are those consisting of methylhydrogensiloxanyl units terminated by trimethylsilyl groups.

The compositions can be cured to hard, abrasion-resistant adhesive films by exposure to temperatures of 150° C. or higher for a few seconds or to lower temperatures for longer periods, for example, some 15 seconds at 120° C. or about 1 minute at 90° C. The temperature selected for curing will, of course, depend on the application for which the composition is being used and the speed of curing can be varied widely by varying the nature and proportions of the constituents. Thus, these compositions can be used and are particularly valuable for use in processes such as paper treating which can be carried out continuously at high speeds. Thus, for example, speeds of up to 500 ft./minute can be used where it is possible to give a dwell time of some 15–30 seconds in a heating zone at 110–120° C. The compositions can also be used to form adhesive films on a wide variety of other substrates, for example, on polyolefin or polyester films such as polypropylene or polyethylene terephthalate, metals such as aluminium, glass and ceramics.

Compositions based on the same organopolysiloxanes have been used hitherto in which an organotin acylate or oximate has been used in conjunction with an amino compound. The present compositions possess a number of advantages over the hitherto used compositions. The previous compositions, for example, have the disadvantage of requiring the accurate measurement of two catalysts which cannot be distributed for use already mixed, thus requiring the compositions to be distributed in three packages of (1) organopolysiloxanes, (2) tin compound and (3) amino compound, whereas the present compositions require only one package for the organopolysiloxanes and one for the tin compound. The present compositions are also capable of fast curing on surfaces, particularly on paper surfaces. Moreover, the present compositions also have the very considerable advantage that they can be used satisfactorily in the so-called "in-line" adhesive lamination process in the paper trade. This process is for the manufacture of self-adhesive labels and consists essentially of the stages (a) coating paper with organopolysiloxane, (b) drying and curing the film, (c) coating on the organopolysiloxane film immediately after cure an adhesive solution and (d) drying the adhesive and applying the label paper thereto. The release level in this process when using the hitherto available fast curing systems has been found to be poor, whereas using the compositions of our invention the required release level can be obtained.

Our invention is further illustrated by the following examples in which all parts and percentages are by weight except where otherwise stated.

EXAMPLE 1

25 parts (0.1 mole) of dibutyltin oxide, 12.1 parts (0.1 mole) of benzaldoxime, 11.8 parts (0.1 mole) of 1-(2-aminoethyl amino)propan-2-ol and 48.9 parts of toluene were heated together under reflux. The water formed (1.8 parts) was removed by azeotropic distillation. There were thus obtained 96 parts of a clear yellow solution of a tin compound of formula

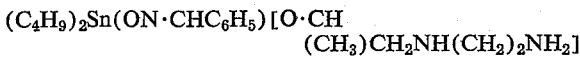

$(C_4H_9)_2Sn(ON \cdot CHC_6H_5)[O \cdot CH(CH_3)CH_2NH(CH_2)_2NH_2]$

EXAMPLE 2

25 parts (0.1 mole) of dibutyltin oxide, 6 parts (0.1 mole) of glacial acetic acid, 11.8 parts (0.1 mole) of 1-(2-aminoethyl amino) propan-2-ol and 42.8 parts of toluene were heated under reflux. The water formed (1.8 parts) was removed by azeotropic distillation. There was thus obtained a clear yellow 50 percent solution of a tin compound of formula

$(C_4H_9)_2Sn(OCOCH_3)[OCH(CH_3)CH_2NHC_2H_4NH_2]$

EXAMPLE 3

25 parts (0.1 mole) of dibutyltin oxide, 3 parts (0.05 mole) of glacial acetic acid, 5.9 parts (0.05 mole) of 1-(2-aminoethyl amino)propan-2-ol and 33.9 parts of toluene were heated under reflux. The water formed (0.9 part) was removed by azeotropic distillation. There was thus obtained a yellow 50 percent solution of a tin compound of formula $(C_4H_9)_2Sn(OCOCH_3)OSn(C_4H_9)_2$
[OCH(CH_3)CH_2NH(CH_2)_2NH_2]

EXAMPLE 4

25 parts (0.1 mole) of dibutyltin oxide, 6 parts (0.05 mole) of benzaldoxime, 5.9 parts (0.05 mole) of 1-(2-amino ethyl amino) propane-2-ol and 36.9 parts of toluene were heated under reflux. The water formed (0.9 part) was removed by azeotropic distillation. There was thus obtained a yellow 50 percent solution of a tin compound of formula $(C_4H_9)_2Sn(ON=CHC_6H_5)OSn(C_4H_9)_2$
[OCH(CH_3)CH_2NH(CH_2)_2NH_2]

EXAMPLE 5

36.3 parts (0.1 mole) of dioctyltin oxide, 6 parts (0.1 mole) of glacial acetic acid, 11.8 parts (0.1 mole) of 1-(2-aminoethyl amino)propan-2-ol and 54.1 parts of toluene were heated under reflux. The water formed (1.8 parts) was removed by azeotropic distillation. There was thus obtained a clear yellow 50 percent solution of a tin compound of formula $(C_8H_{17})_2Sn(OCOCH_3)[OCH(CH_3)$
$CH_2NH(CH_2)_2NH_2]$

EXAMPLE 6

36.3 parts (0.1 mole) of dioctyltin oxide, 6 parts (0.05 mole) of benzaldoxime, 5.9 parts (0.05 mole) of 1-(2-aminoethyl amino)propan-2-ol and 48.2 parts of toluene were heated under reflux. The water formed (0.9 part) was removed by azeotropic distillation. There was thus obtained a yellow solution of a tin compound of formula $(C_8H_{17})_2Sn(ON=CHC_6H_5)OSn(C_8H_{17})_2$
[OCH(CH_3)CH_2NHC_2H_4NH_2]

EXAMPLE 7

25 parts 0.1 mole) of dibutyltin oxide, 6.0 parts (0.1 mole) of glacial acetic acid, 55.7 parts of toluene, 24.7 parts (0.1 mole) of the alcohol produced by reaction of tetra-ethylene pentamine and propylene oxide were heated under reflux. The water formed (1.8 parts) was removed by azeotropic distillation. There was thus obtained a clear yellow 50 percent solution of a tin compound of formula $(C_4H_9)_2Sn(OCOCH_3)[OCH(CH_3)CH_2$
$(NHCH_2CH_2)_4NH_2]$

EXAMPLE 8

25 parts (0.1 mole) of dibutyltin oxide, 6.0 parts (0.1 mole) of glacial acetic acid, 54.3 parts of toluene and 23.3 parts (0.1 mole) of the alcohol produced by reaction of tetra-ethylene pentamine and ethylene oxide were heated under reflux. The water formed (1.8 parts) was removed by azeotropic distillation. There was thus obtained a yellow 50 percent solution of tin compound of formula $(C_4H_9)_2Sn(OCOCH_3)[OCH_2CH_2(NHCH_2CH_2)_4NH_2]$

EXAMPLE 9

25 parts (0.1 mole) of dibutyltin oxide, 6.0 parts (0.1 mole) of glacial acetic acid, 47.1 parts of toluene, 16.1 parts (0.1 mole) of the alcohol produced by reaction of diethylene triamine and propylene oxide were heated under reflux. The water formed (1.8 parts) was removed by azeotropic distillation. There was thus obtained a yellow 50 percent solution of a tin compound of formula $(C_4H_9)_2Sn(OCOCH_3)[OCH(CH_3)CH_2$
$(NHCH_2CH)_2NH_2]$

EXAMPLE 10

25 parts (0.1 mole) of dibutyltin oxide, 6.0 parts (0.1 mole) of glacial acetic acid, 6.0 parts (0.1 mole) of ethanolamine and 37 parts of toluene were heated under reflux. The water formed (1.8 parts) was removed by azeotropic distillation. There was thus obtained a 50 percent solution of a tin compound of formula $(C_4H_9)_2Sn(OCOCH_3)(O\cdot CH_2CH_2NH_2)$

EXAMPLE 11

25 parts (0.1 mole) of dibutyltin oxide, 6.0 parts (0.1 mole) of glacial acetic acid, 8.9 parts (0.1 mole) of aminobutanol and 39.9 parts of toluene were heated under reflux. The water formed (1.8 parts) was removed by azeotropic distillation. There was thus obtained a 50 percent solution of (acetoxy) (aminobutoxy) (dibutyl) stannane of formula $(C_4H_9)_2Sn(OCOCH_3)[O\cdot CH_2CH(NH_2)CH_2CH_3]$

EXAMPLE 12

25 parts (0.1 mole) of dibutyltin oxide, 12.1 parts (0.1 mole) of benzaldoxime, 8.9 parts (0.1 mole) of aminobutanol and 46 parts of toluene were heated under reflux. The water so formed (1.8 parts) was removed by azeotropic distillation. There was obtained a 50 percent solution of a tin compound of formula $(C_4H_9)_2Sn(ON=CHC_6H_5)[O\cdot CH_2CH(NH_2)CH_2CH_3]$

EXAMPLE 13

25 parts (0.1 mole) of dibutyltin oxide, 6.0 parts (0.1 mole) of glacial acetic acid, 8.8 parts (0.1 mole) of N,N-dimethylamino-ethanol and 39.8 parts of toluene were heated under reflux. The water formed (1.8 parts) was removed by azeotropic distillation. There was thus obtained a 50 percent solution of a tin compound of formula $(C_4H_9)_2Sn(OCOCH_3)[O\cdot C_2H_4N(CH_3)_2]$

EXAMPLES 14–19

Six compositions were made up consisting of the following:

100 parts of a toluene solution of 10 parts of linear hydroxy-ended dimethylpolysiloxane of viscosity $10^7$ cs. at 25° C., 0.6 part of a linear trimethylsilyl-ended methylhydrogenpolysiloxane of viscosity 20 cs. at 25° C. and Me/Si ratio 1.08:1 and $x$ parts of a 50 percent solution in toluene of a tin compound as tabulated below.

Vegetable parchment papers were coated with each of the so prepared solutions to give weights of organopolysiloxane deposited of 0.7–1.0 g./m.² and the coatings given a cure at 120° C. in a forced draught air oven. The films so obtained were very resistant to rubbing with the finger, did not smear when so rubbed and possessed excellent release properties, particularly towards pressure sensitive adhesives.

| Example | Tin compound of Example | Parts ($x$) | Cure time at 120° C. (sec.) |
| --- | --- | --- | --- |
| 14 | 1 | 3.0 | 10 |
| 15 | 2 | 2.8 | 5–10 |
| 16 | 3 | 2.7 | 15 |
| 17 | 4 | 2.7 | 15 |
| 18 | 5 | 3.0 | 15 |
| 19 | 6 | 3.1 | 15 |

EXAMPLES 20–22

Three compositions were made up in the same manner as in Examples 14–19.

Polyethylene coated kraft papers were coated using the above catalysed solutions to give weights of organopolysiloxane deposited of 0.5–0.7 g./m.² and the coatings given a cure at 120° C. in a forced draught air oven. The coatings were non-smearing and abrasion-resistant. They also had excellent release properties against pressure-sensitive adhesives.

| Example | Tin compound of Example | Parts (x) | Cure time at 120° C. (sec.) |
|---|---|---|---|
| 20 | 7 | 2.4 | 10 |
| 21 | 8 | 2.5 | 10 |
| 22 | 9 | 2.4 | 15 |

EXAMPLES 23–26

Four compositions were prepared in the manner described in Examples 14 to 19.

Vegetable parchment papers were coated with each of the so prepared solutions to give weights of organopolysiloxane deposited of 0.7–1.0 g./m.$^2$ and the coatings given a cure at 120° C. in a forced draught air oven. The films so obtained were smear-free, abrasion-resistant and gave excellent release properties when used against pressure-sensitive adhesives.

| Example | Tin compound of Example | Parts (x) | Cure time at 120° C. (sec.) |
|---|---|---|---|
| 23 | 10 | 1.6 | 30 |
| 24 | 11 | 1.6 | 25 |
| 25 | 12 | 1.8 | 30 |
| 26 | 13 | 1.8 | 30 |

EXAMPLE 27

Four compositions were made up each consisting of the following:

100 parts of toluene solution of 10 parts of linear hydroxy-ended dimethylpolysiloxane of viscosity 10$^7$ cs. at 25° C., 0.6 part of a linear trimethylsilyl-ended methylhydrogenpolysiloxane of viscosity 20 cs. at 25° C. and Me/Si ratio 1.08:1 and x parts of a 50 percent solution in toluene of (acetoxy)[1,2-(aminoethyl amino)isopropoxy](dibutyl)stannane.

Vegetable parchment papers were coated with each of the so prepared solutions to give weights of organopolysiloxane deposited of 0.7–1.0 g./m.$^2$ and the coatings given a cure at 120° C. in a forced draught air oven. Immediately after curing, the siloxane films were coated with a solvent solution of a rubber-based adhesive. The adhesive was dried and brought into contact with a commercially available label paper. This label laminate was stored under pressure for 24 hours at 20° C., after which the release force necessary to separate a 1 inch wide strip of label from the siloxane treated backing papers was determined.

The following table shows release values obtained with various concentrations of the organotin compound.

Parts of tin
compound (x): Release value (g./1″)
1.0 ............................................ 30
1.7 ............................................ 25
2.3 ............................................ 36
3.0 ............................................ 45

As can be seen from the table the catalyst concentration in the siloxane coating formulation can be adjusted in order to give the optimum release value for the particular adhesive under test. In this same type of test, an organopolysiloxane formulation catalysed with the normal fast curing catalysts gave release coatings having release values of 50–70 g./1″.

EXAMPLE 28

25 parts (0.1 mole) of dibutyltin oxide, 3 parts (0.05 mole) of glacial acetic acid, 17.7 parts (0.15 mole) of 1-(2-aminoethyl amino)isopropanol and 45.7 parts of toluene were heated under reflux. The water formed (1.8 parts) was removed by azeotropic distillation. There was thus obtained a solution of a mixture of compounds of the formulae $(C_4H_9)_2Sn(OCOCH_3)[OCH(CH_3)CH_2NH(CH_2)_2NH]$ and $(C_4H_9)_2Sn[OCH(CH_3)CH_2NH(CH_2)_2NH_2]_2$

EXAMPLE 29

25 parts (0.1 mole) of dibutyltin oxide, 9 parts (0.15 mole) glacial acetic acid, 5.9 parts (0.05 mole) of 1-(2-aminoethyl amino)isopropanol and 39.9 parts of toluene were heated under reflux. The water formed (1.8 parts) was removed by azeotropic distillation. There was thus obtained a yellow solution of equal amounts of compounds of the general formula $(C_4H_9)_2Sn(OCOCH_3)[OCH(CH_3)CH_2NH(CH_2)_2NH_2]$ and $(C_4H_9)_2Sn(OCOCH_3)_2$

EXAMPLE 30

The procedures of Examples 23 to 26 were followed using the tin compounds prepared according to Examples 28 and 29 in the proportions indicated, with the following results:

| Tin compound of Example: | Parts (x) | Cure time at 120° C. (sec.) |
|---|---|---|
| 28 | 3.0 | 60 |
| 29 | 2.8 | 15 |

The catalyst of Example 28 gives lower efficiency with respect to cure times and also the catalyst was less soluble in organic solvents, whereas the catalyst of Examples 29 gives fast cure times but the film obtained was less abrasion-resistant than those given by the preferred catalysts.

EXAMPLE 31

25 parts (0.1 mole) of dibutyltin oxide and 23.6 parts (0.2 mole) of 1-(2-aminoethylamine)-propan-2-ol were mixed in 50 parts of toluene and heated to remove water azeotropically. The theoretical quantity of water was removed (1.8 parts) and the white to pale yellow solid was removed from the solvent by filtration under anhydrous conditions to give 46.8 parts of a solid consisting essentially of a compound of formula $(C_4H_9)_2Sn[OCH(CH_3)NHCH_2CH_2NH_2]_2$ This solid was completely insoluble in cold toluene.

EXAMPLE 32

The white solid prepared in Example 31, 24.3 parts (0.05 mole) and 17.5 parts (0.05 mole) of diacetoxy dibutyl stannane were mixed in 41.8 parts of toluene. An exothermic reaction took place and the white solid dissolved in the mixture. The solution was heated to reflux for 2 hours and resulted in a pale yellow solution consisting essentially of 50 percent of a compound of formula $(C_4H_9)_2Sn(OCOCH_3)[OCH(CH_3)CH_2NHCH_2CH_2NH_2]$ When tested under the same conditions as used in Example 15 for the compound from Example 2 the following result was obtained.

Tin compound of example 31:
    Parts (x) ............................................ 2.8
    Cure time at 120° C. (sec.) ............................................ 5–10

What we claim is:

1. A tin compound selected from the group consisting of compounds of the general formula $YO(R_2SnO)_mX$ where R is an alkyl group having not more than 20 carbon atoms, Y is a group of the formula

in which $R^3$ is selected from the group consisting of hydrogen and monovalent hydrocarbon groups, X is an aminoalkyl group of the formula $(R^4R^5NR^6-)$ where $R^4$ and $R^5$, which need not be alike, are selected from the group consisting of hydrogen, alkyl, cycloalkyl and aminoalkyl groups, $R^6$ is alkylene, the essential nitrogen atom in the group X being bonded to a carbon atom in the group $R^6$ other than that joined to tin by C-O-Sn linkage, and m is an integer from 1 to 4.

2. A tin compound according to claim 1 wherein the alkyl groups R are butyl or octyl groups.

3. A tin compound according to claim 1 wherein the groups $R^3$, $R^4$ and $R^5$ each have less than 5 carbon atoms.

4. A tin compound according to claim 3 wherein the groups $R^4$ and $R^5$ are selected from the group consisting of hydrogen, methyl and ethyl groups.

5. A process for preparing a tin compound as claimed in claim 1 wherein an organotin oxide is reacted with a carboxylic acid in presence of an organic solvent and the reaction product is thereafter reacted with an amino-alcohol.

6. A process for preparing a tin compound as claimed in claim 1 wherein an organotin oxide is reacted with an amino-alcohol and the product is thereafter reacted with an organotin acylate.

7. A tin compound according to claim 1 wherein R is butyl, $R^3$ is methyl, m is one and X is

—CH(CH$_3$)CH$_2$NHC$_2$H$_4$NH$_2$

References Cited
UNITED STATES PATENTS

| | | | |
|---|---|---|---|
| 3,275,659 | 9/1966 | Weissenberger | 260—429.7 |
| 3,311,647 | 3/1967 | Stamm | 260—429.7 |
| 3,346,607 | 10/1967 | Lombardo | 260—429.7 |
| 3,347,890 | 10/1967 | Davies | 260—429.7 |
| 3,355,469 | 11/1967 | Herbstman | 260—429.7 |
| 3,422,127 | 1/1969 | Fish | 260—429.7 |

WERTEN F. BELLAMY, Primary Examiner

U.S. Cl. X.R.

117—154